United States Patent Office 3,050,932
Patented Aug. 28, 1962

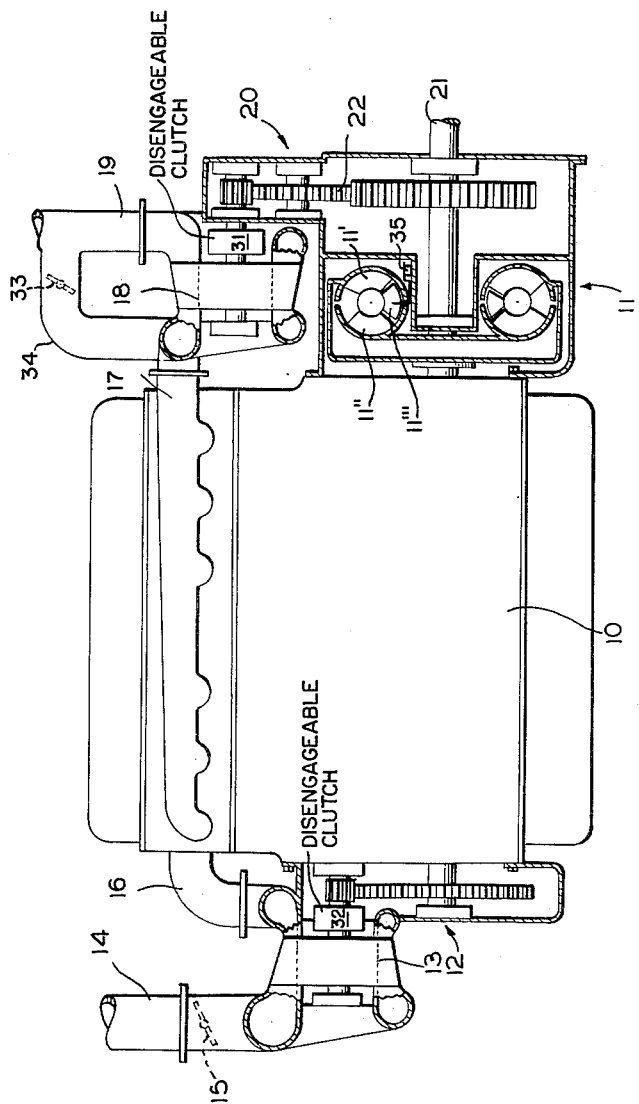

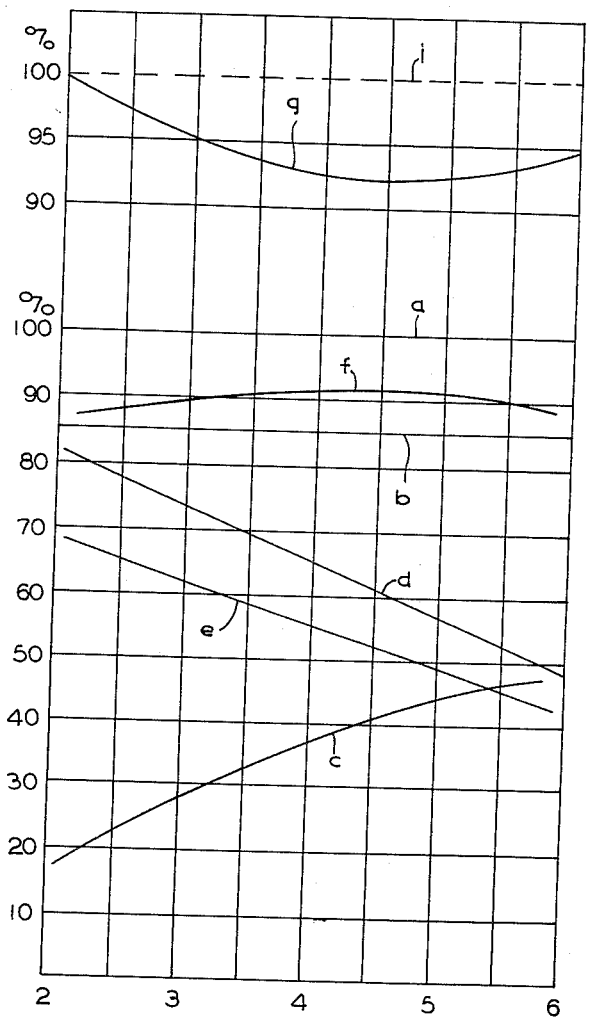

3,050,932
AUXILIARY TURBINE DRIVE ARRANGEMENT FOR SUPERCHARGED INTERNAL COMBUSTION ENGINES
Alfred H. Mueller, Waiblingen, Germany, assignor to Daimler-Benz Aktiengesellschaft, Stuttgart-Unterturkheim, Germany
Filed Dec. 30, 1958, Ser. No. 783,847
Claims priority, application Germany Jan. 18, 1958
18 Claims. (Cl. 60—13)

The present invention relates to a supercharged internal combustion engine adapted to be used, in particular, as a driving engine for the drive of vehicles or the like.

The present invention is concerned with an improvement in an internal combustion engine having a turbine-like torque conversion characteristic and a favorable efficiency.

The problems and shortcomings, normally inherent in and usually encountered with such an arrangement, are solved in accordance with the present invention by operatively connecting the crankshaft of an internal combustion engine, on the one hand, over a hydrodynamic torque converter with the driven shaft and, on the other, either directly or over an intermediate gearing arrangement with the blower or supercharger, and by coordinating to or operatively connecting with the internal combustion engine an exhaust gas turbine which in turn is operatively connected with the output thereof either directly or over another intermediate gearing arrangement with the driven shaft in bypassing relationship with respect to the hydrodynamic torque converter.

It is already known in the prior art to transmit the output of an internal combustion engine over a hydrodynamic torque converter or fluid coupling to the driven shaft. This, however, results in the disadvantage that the available usable output power decreases as a result of the torque converter losses. The same disadvantage also exists if the supercharger blower is driven by an exhaust gas turbine.

The arrangement in accordance with the present invention in particular appropriate and effective if the exhaust gas turbine and the supercharger blower exhibit, by appropriate corresponding construction or control thereof, at least approximately the same output and/or input requirements, respectively. Furthermore, the two intermediate gearing arrangements between the crankshaft and the blower, on the one hand, and between the turbine and driven shaft, on the other, may have the same gearing ratios. The gearing arrangements are appropriately constructed as gear wheel transmissions having at least in part the same gears whereby, for purposes of spanning different axle distances, possibly intermediate idling gear wheels may be interconnected or interposed.

The present invention produces a prime mover or engine in which the output is transmitted to the driven shaft over a turbine and a hydrodynamic torque converter, i.e., by means of two turbine-like aggregates, of which the torque conversion characteristics have about the same performance curves. The internal combustion engine thereby acts as a gas producer for the turbine, so to speak. The internal combustion engine may be brought thereby to a relatively high rotational speed with the driven or output shaft at standstill so that the largest possible torque for the acceleration is made available. At the same time, the output losses in the torque converter are effective only with respect to a portion of the over-all output of the prime mover or engine aggregate.

Moreover, by reason of the fact that at least some of the individual elements are identical, such as, for example, the gearing arrangements, a prime mover or engine results from the present invention which exhibits an over-all structural simplicity and which may be manufactured relatively inexpensively.

Accordingly, it is an object of the present invention to provide an arrangement for a prime mover or engine, particularly for driving motor vehicles, which is characterized by improved efficiency characteristics.

It is another object of the present invention to provide an internal combustion engine arrangement including a supercharger which is efficient, simple in construction, and which minimizes the costs connected with the manufacture thereof.

Still another object of the present invention resides in the provision of an internal combustion engine which is operatively connected with the output shaft over a torque converter, on the one hand, and over an auxiliary drive connection bypassing the torque converter and including the blower of a supercharger and an exhaust gas turbine, on the other, so as to increase the over-all efficiency of the engine arrangement and to minimize the losses which occur particularly during operation with a relatively high torque conversion.

A further object of the present invention resides in the provision of an arrangement for an internal combustion engine effectively driving both the input and output shafts of a torque converter which reduces effectively those losses in the torque converter that are particularly objectionable during the high starting torques required for starting the vehicle.

Still another object of the present invention is the provision of a supercharger and exhaust gas turbine operatively connected with the internal combustion engine in such a manner that the supercharger and exhaust gas turbine have about the same turbine-like characteristics so as to improve the operating characteristics of the over-all arrangement.

These and other objects, features and advantages of the present invention will become more obvious from the following description when taken in connection with the accompanying drawing which shows, for purposes of illustration only, one embodiment in accordance with the present invention, and wherein:

FIGURE 1 is a side view, partly in cross section, of the over-all arrangement of a driving installation in accordance with the present invention; and FIGURE 2 is a diagram showing curves for the efficiency plotted against pressure conditions of the supercharger.

Referring now to the drawing, and more particularly to FIGURE 1, reference numeral 10 designates therein an internal combustion engine of any suitable construction which includes a crank shaft operatively connected, on the one hand, with the impeller or pump wheel of a hydrodynamic torque converter generally designated by reference numeral 11 and, on the other, over an intermediate transmission generally designated by reference numeral 12 with the supercharger designated by reference numeral 13. The torque converter 11 is of conventional construction and includes impeller means 11', turbine means 11" and guide wheel means 11''' held against rotation by a one-way clutch 35 as is well known in the prior art. The intermediate transmission 12 is constructed as mechanical gearing arrangement consisting of meshing gear wheels and providing a step-up transmission ratio so that the blower of the supercharger 13 is driven at an increased, relatively higher rotational speed.

In the embodiment illustrated herein, the transmission 12 is a single-step countershaft-type gearing arrangement. However, any other suitable gearing arrangement producing the desired transmission ratio may be used, for example, a gearing arrangement involving a plurality of gear wheels.

The supercharger or blower 13 draws in the combustion air or the gas fuel mixture over the inlet connection 14 in which a throttling valve 15 is arranged for the engine control and possibly also a filter (not shown). The supercharged or pre-compressed combustion air or combustion mixture is conducted through the inlet channel or manifold 16 to the individual cylinders of the internal combustion engine 10. The exhaust gases of the internal combustion engine are collected in the exhaust manifold 17 and are supplied or conducted to an exhaust gas turbine 18. The exhaust gases from the internal combustion engine thereby give off a certain amount of energy in the exhaust gas turbine, as is well known, that is converted into mechanical energy and, following a corresponding drop in the pressure thereof, are conducted through the exhaust manifold 19 into the atmosphere. The output of the exhaust gas turbine 18 is thereby transmitted directly, i.e., by a positive connection, to the driven or output shaft 21 over an intermediate gearing arrangement or speed reduction transmission 20 whereby the driven or output shaft 21 is simultaneously connected with the turbine wheel of the hydrodynamic torque converter 11. The intermediate transmission 20 may again be constructed as a mechanical countershaft speed reduction gearing arrangement, though any other suitable transmission providing the desired speed reduction ratio may be used.

A particularly favorable arrangement results in the application of the present invention if the supercharger or blower 13 and the exhaust gas turbine 18 exhibit, by appropriate design and construction and/or control thereof, the same or at least the same output and input requirements, respectively. Furthermore, it is appropriate, in accordance with the present invention, if the intermediate mechanical transmissions 12 and 20 have the same step-up and step-down transmission ratios. The crankshaft rotational speed of the internal combustion engine 10 is thereby increased by the intermediate transmission 12 from a speed of, for example, 3000 r.p.m., by the use of a transmission step-up ratio of 1:5, to a rotational speed of the supercharger 13 of, for example, 15,000 r.p.m. The intermediate transmission 20 then again reduces the relatively high rotational speed of the exhaust gas turbine 18, rotating, for example, at 12,500 r.p.m. by the use of a speed-reduction ratio of 5:1 to the relatively lower rotational speed of the driven shaft 21, for example, to 2,500 r.p.m. Possibly the same gear wheels may be used for both transmissions 12 and 20, whereby, in case of different axle distances, for example, by reason of a different distance of the gas turbine 18 from the crankshaft as compared to that of the blower 13, a further gear wheel 22 may be provided in the intermediate transmission 20, which, however, does not influence the transmission ratio thereof.

FIGURE 2 shows a diagram of the curves representing the percentage of over-all efficiency and of the specific fuel consumption plotted against the pressure conditions prevailing in the supercharger 13. The output and efficiency of an internal combustion engine which is supercharged in the usual manner and the supercharger or blower of which is driven by an exhaust gas turbine is thereby used as reference. The efficiency of such an arrangement is indicated in FIGURE 2 by the curve $a$ which represents a 100% efficiency, constituting the reference efficiency to which the present invention will be compared. With a torque converter efficiency of 85%, only 85% of the engine output would then be normally available at the driven shaft 21 with an internal combustion engine supercharged in the usual manner, as indicated by curve $b$ in FIGURE 2. The output of the exhaust gas turbine 18 provided with a prime mover or engine arrangement in accordance with the present invention is represented by curve $c$. Since, in accordance with the present invention, the input requirement of the supercharger 13 is the same or at least approximately the same as the output of the gas turbine 18, the curve $c$ simultaneously therewith also represents the load formed by the supercharger or blower 13. The output available at the input of the hydrodynamic torque converter 11 in accordance with the present invention is, therefore, equal to the crankshaft output corresponding to curve $a$ less the energy requirements of the blower or supercharger 13 represented by curve $c$. This power input of the torque converter 11 is represented by curve $d$ in FIGURE 2. As a result of the losses in torque converter 11, which again may amount to about 15%, only a lower output is available at the output of the torque converter 11, which output is reduced by this 15% and is indicated in FIGURE 2 by the curve $e$. However, to the output of the torque converter 11 is added the output of the exhaust gas turbine 18 represented by the curve $c$. Consequently, in the arrangement according to the present invention, the over-all output is represented by the curve $f$. This curve $f$ in accordance with the present invention is higher than the over-all output curve $d$ of an internal combustion engine supercharged in the usual manner.

This increase or gain in efficiency is also noticeable, of course, in the specific fuel consumption. If, for example, the specific fuel consumption of the normally supercharged internal combustion engine is shown and represented by the curve $i$ indicating a reference consumption of 100%, then the specific fuel consumption in accordance with the present invention, as a result of the output gain by the use of the prime mover arrangement in accordance with the present invention is lower as indicated by the curve $g$.

The main or principal advantages of the engine arrangement in accordance with the present invention are, therefore, a favorable torque conversion characteristic which is similar to that of a gas turbine. Furthermore, the dimensions of the hydrodynamic torque converter 11 may be kept smaller because of the added output supplied to the driven shaft 21 from the exhaust gas turbine. Additionally, a relatively higher specific output and a relatively lower specific fuel consumption are achieved.

While I have shown one embodiment in accordance with the present invention, it is understood that the same is not limited thereto. For example, it is also possible to insert into the connection between the exhaust gas turbine 18 and the driven shaft 21 a disengageable clutch, for example, a friction-disk clutch schematically indicated in FIGURE 1 and designated by reference numeral 31. Additional modifications in accordance with the present invention are also possible, for example, by constructing the supercharger 13 and/or the exhaust gas turbine 18 so as to be disengageable from the internal combustion engine which may be realized in the former case by providing a conventional disengageable clutch such as a friction clutch schematically shown in FIGURE 1 and designated therein by reference numeral 32, and in the latter case, for example, by conducting the exhaust gases over any suitable conventional valving arrangement, such as a slide valve 33 located in a by-pass duct 34, directly to the exhaust line 19. By the use of such an arrangement, the starting of the internal combustion engine may be facilitated.

Thus, the present invention is not limited to the particular embodiment illustrated herein but is susceptible of many changes and modification within the scope and spirit of the present invention and I, therefore, do not wish to be limited to the specific embodiment illustrated herein but intend to cover all such changes and modifications as are encompassed by the scope of the appended claims.

I claim:

1. A drive arrangement with turbine-like conversion characteristics and favorable efficiency and using a supercharged internal combustion engine having a crankshaft comprising, output means, connecting means including hydraulic torque converter means operatively connecting said crankshaft with said output means, supercharger means, transmission means operatively connecting said supercharger means with said crankshaft, and means additionally and effectively connecting said engine with said output means in bypassing relationship with respect to said torque converter means including exhaust gas turbine means driven by the exhaust gases of said internal combustion engine and having an output member and transmission means separate from said connecting means and said first-mentioned transmission means operatively connecting the output member of said exhaust gas turbine means with said output means.

2. A drive arrangement using a supercharged internal combustion engine according to claim 1, wherein said two transmission means provide the same transmission ratios, one being a step-up transmission and the other a step-down transmission, and wherein said supercharger means and said exhaust gas turbine means have approximately identical load and output characteristics, respectively.

3. A drive arrangement using a supercharged internal combustion engine according to claim 1, further comprising means for rendering said supercharger means ineffective.

4. A drive arrangement using a supercharged internal combustion engine according to claim 1, further comprising means for rendering said exhaust gas turbine means ineffective.

5. A drive arrangement using a supercharged internal combustion engine according to claim 4, further comprising means for selectively rendering said supercharger means ineffective.

6. A drive arrangement with turbine-like conversion characteristics and favorable efficiency and using a supercharged internal combustion engine having a crankshaft and cylinder means, particularly for the drive of vehicles or the like, comprising an output shaft, torque converter means having impeller means operatively connected with said crankshaft and turbine means operatively connected with said output shaft, supercharger means having an input member and an output, step-up gearing means operatively connecting only said crankshaft with said supercharger input member to rotate the latter at a higher speed with respect to the former, an intake manifold connected to said supercharger to supply compressed combustion air to said cylinder means from the output of said supercharger means, and means effectively and operatively connecting said crankshaft engine with said output shaft including exhaust gas turbine means having an input and an output member, an exhaust manifold connected to said gas turbine means to supply exhaust gases from said cylinder means to said exhaust gas turbine input and step-down gearing means operatively connecting only said gas turbine output member with said output shaft.

7. A drive arrangement using a supercharged internal combustion engine according to claim 6, wherein the distance between said supercharger input member and said crankshaft is different from the distance of said exhaust gas turbine output member and said output shaft, and wherein one of said gearing means includes a larger number of gears than the other gearing means so as to compensate for the greater distance in the spacing of the two respective parts connected thereby.

8. A drive arrangement using a supercharged internal combustion engine according to claim 6, further comprising disengageable means between the connection of said exhaust gas turbine output member and said output shaft.

9. A drive arrangement using a supercharged internal combustion engine according to claim 6, further comprising means for selectively and effectively disengaging at least one of said supercharger means and said gas turbine means from said internal combustion engine.

10. A drive arrangement using a supercharged internal combustion engine according to claim 9, wherein said last-mentioned means is operative to selectively disengage said exhaust gas turbine from said internal combustion engine and includes valve means for directly conducting the exhaust gases from said cylinder means to the atmosphere.

11. A drive arrangement particularly for driving a vehicle or the like which has turbine-like conversion characteristics and favorable efficiency and includes a supercharged internal combustion engine provided with a crankshaft, comprising output shaft means, connecting means including hydrodynamic torque converter means operatively connecting said crankshaft with said output shaft means, supercharger means including input shaft means and drive means separate from said connecting means operatively connecting said supercharger input shaft means with said crankshaft, gas turbine means driven by the exhaust gases of said engine and having an output member, and further connecting means separate from said connecting means operatively connecting said output member of said gas turbine means with said output shaft means to thereby transmit the torque produced in said gas turbine means to said output shaft means in bypassing relationship with respect to said torque converter means.

12. A drive arrangement including a supercharged internal combustion engine according to claim 11, said supercharger means has a predetermined input characteristic as regards the power required to drive the same and wherein said exhaust gas turbine means has a predetermined output characteristic as regards the output power delivered thereby, and wherein said supercharger means and said exhaust gas turbine means are constructed in such a manner that the said input characteristic of said supercharger means is approximately the same as the said output characteristic of said turbine means.

13. A drive arrangement including a supercharged internal combustion engine according to claim 11, wherein said further connecting means includes disengageable means for selectively disengaging said gas turbine means from said output shaft means.

14. A drive arrangement including a supercharged internal combustion engine according to claim 11, further comprising disengageable means for selectively disengaging said crankshaft from said supercharger means.

15. A drive arrangement including a supercharged internal combustion engine according to claim 11, wherein said drive means and said further connecting means include disengageable means for selectively disengaging said crankshaft from said supercharger means and for selectively disengaging said exhaust gas turbine means from said output shaft means, respectively.

16. A drive arrangement including a supercharged internal combustion engine according to claim 11, further including bypass valve means for selectively bypassing the exhaust gases during engine starting from said internal combustion engine around said exhaust gas turbine means to the atmosphere.

17. A drive arrangement particularly for driving a vehicle or the like which has turbine-like conversion characteristics and favorable efficiency and which includes supercharged internal combustion engine provided with a crankshaft, an intake manifold and an exhaust manifold, comprising a load shaft, first means including a hydrodynamic torque converter for drivingly connecting said crankshaft with said load shaft, supercharging means for supplying air to said intake manifold and including a blower provided with a driving member, second means independent of said first means for drivingly connecting said crankshaft with said driving member, a gas turbine driven by the exhaust gases in said exhaust manifold and provided with an output member, and third means independent of said first and second means for drivingly connecting said output member with said load shaft in by-passing relationship with respect to said torque converter.

18. A drive arrangement having turbine-like conversion characteristics and favorable efficiency and including a supercharged internal combustion engine provided with a crankshaft, an intake manifold and an exhaust manifold, comprising an output shaft, a first connection including a hydrodynamic converter connecting said crankshaft with said output shaft, supercharger means for supplying combustion air to said intake manifold, a second connection drivingly connecting only said crankshaft with said supercharger means, exhaust gas turbine means driven by the exhaust gases in said exhaust manifold and including an output member, and a third connection drivingly connecting only said output member with said output shaft in by-passing relationship with respect to said hydrodynamic torque converter, said second and third connections being separate from each other and from said first connection.

References Cited in the file of this patent

UNITED STATES PATENTS

| | | |
|---|---|---|
| 2,375,852 | Kilchenmann | May 15, 1945 |
| 2,559,623 | Holmes | July 10, 1951 |
| 2,570,101 | Couling | Oct. 2, 1951 |
| 2,585,968 | Schneider | Feb. 19, 1952 |
| 2,625,006 | Lundquist | Jan. 13, 1953 |
| 2,656,675 | Coar | Oct. 27, 1953 |
| 2,755,618 | Peterson | July 24, 1956 |
| 2,848,866 | Geislinger | Aug. 26, 1958 |

FOREIGN PATENTS

| | | |
|---|---|---|
| 975,950 | France | Oct. 17, 1950 |
| 1,034,925 | Germany | July 24, 1958 |